H. V. WELCH.
PROCESS FOR RECOVERY OF METALS FROM THEIR ORES.
APPLICATION FILED AUG. 11, 1917.
1,338,271.
Patented Apr. 27, 1920.
2 SHEETS—SHEET 1.
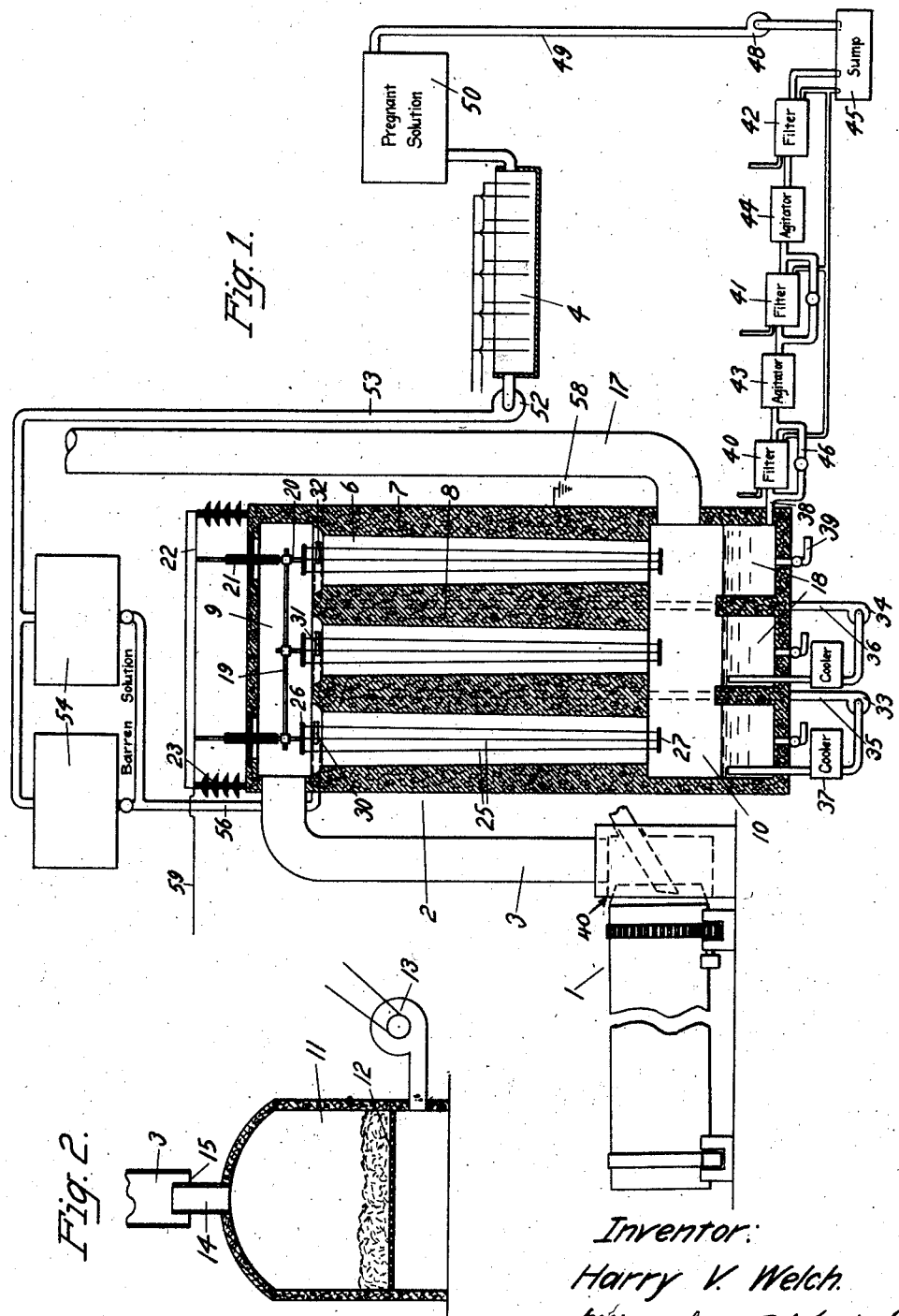
Inventor:
Harry V. Welch.
by: Arthur P. Knight
his Attorney.

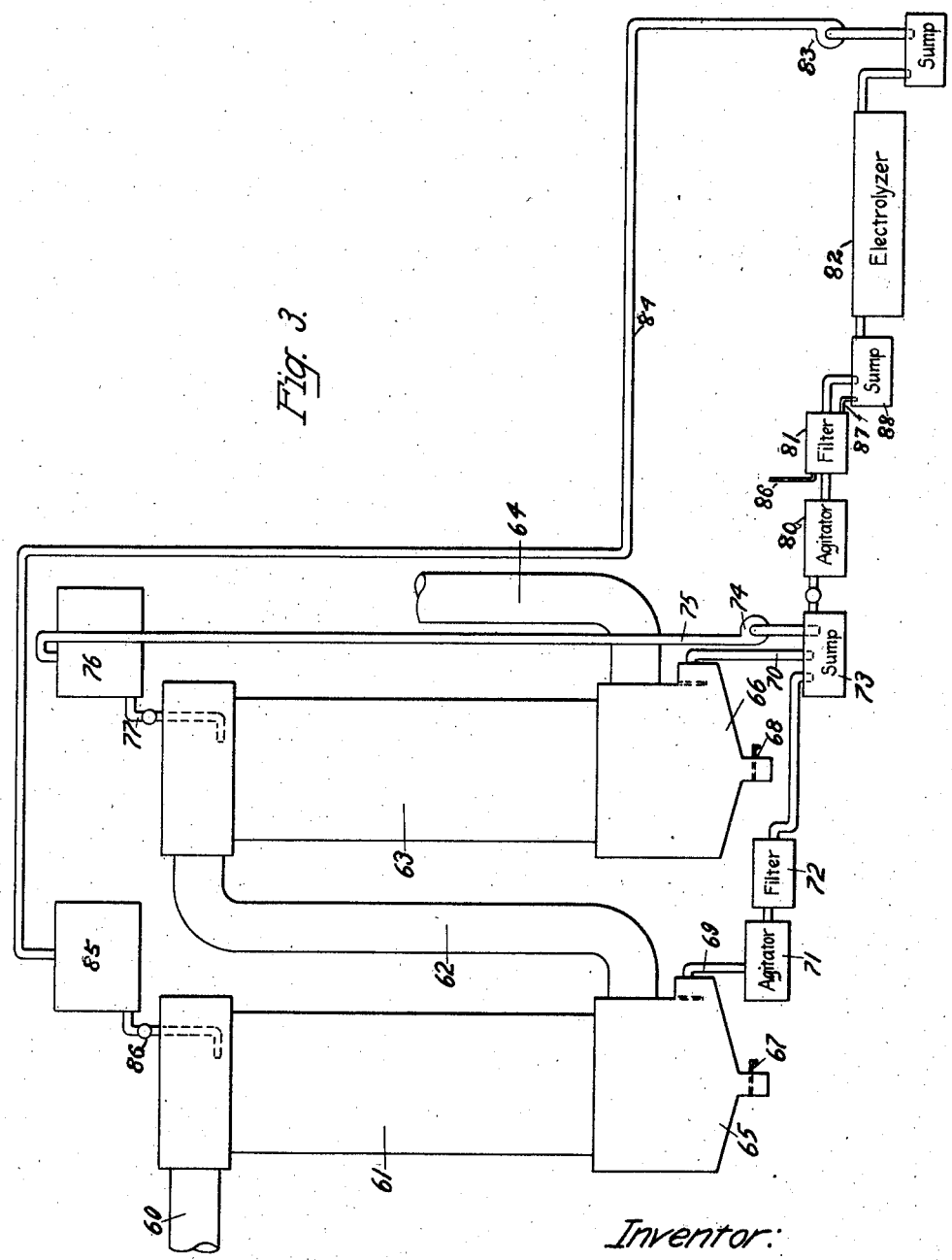

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR RECOVERY OF METALS FROM THEIR ORES.

1,338,271.  Specification of Letters Patent.  Patented Apr. 27, 1920.

Application filed August 11, 1917. Serial No. 185,778.

*To all whom it may concern:*

Be it known that I, HARRY V. WELCH, a citizen of the United States, residing at Los Angeles, in the county of Los Angeles, State of California, have invented a new and useful Process for Recovery of Metals from Their Ores, of which the following is a specification.

This invention relates to recovery of metals from their ores, and is particularly intended for the recovery of zinc, the main object of the invention being to provide for highly efficient recovery of zinc or other metal. Another object of the invention is to eliminate the waste which usually occurs in zinc roasting operations by loss of zinc in fumes from roasting furnaces.

For the production of zinc of high quality, electrolytic processes are now in use, involving solution of the zinc ore, after preliminary roasting, if necessary, and electrodeposition of zinc from the resulting solution. An important object of the present invention is to simplify the processes or operations required in the production of zinc by electrolytic action.

In order that my invention may be more fully understood, I will first describe the process now in use for hydro-metallurgy of zinc.

The ore, commonly a mixture of sulfids of the metals, zinc, iron, lead, etc., etc., is roasted usually at as low an operating temperature as is practical for the production of metallic oxid and sulfate. The operating temperature (usually a low red heat) is maintained at its lowest minimum consistent with proper economic working of the furnace, for the double purpose of, first, preventing the production of acid insoluble compounds of zinc with iron and silica, and secondly, diminution to the least possible amount of the dust and fume losses carried with and removed by the furnace gases. The so roasted material is then charged to tanks containing solution of sulfuric acid, usually in moderate concentration, and by means of mechanical mixing devices, the mixture of solution and ore is kept in continual agitation for a sufficient interval of time, to bring into solution the easily dissolved metallic constituents of roasted ore. The extraction of the zinc content by this operation is seldom complete, 80% in plant operation being considered good, and in cases where furnace capacity has been sought by increasing roasting temperature, the extraction may fall to 65%, or even lower. The extraction by acid leach upon the roasted mixed sulfid ores or concentrates, not only brings into solution the zinc constituent, but as well, the partial or complete solution of the many other metallic oxids or sulfate constituents, such as Fe, Cd, As and Sb, which may be present either in considerable quantities like the iron, or minute amounts, like the Cd, As and Sb, but usually must be completely removed in the final purification of the solution for the electrical deposition cells. The solution and pulp, following tank leaching, are then separated by decantation or filtration, either before or after the precipitation of the dissolved iron by lime. The neutral solution resulting as filtrate during removal of the Fe, etc., is treated with finely divided metallic Zn or ZnO for displacement and precipitation of all metallic constituents of lower solution pressure than the zinc, but especially for the removal of the Cd content. The period of treatment required for the production and purification of the solution, and as well, the difficulties inherent in the filtration of such colloidal or like precipitates as ferric hydrate, $Fe_2(OH_6)$, make the process one of extended operation, and while the leaching of the zinc and other constituents from mixtures of gangue and minerals in masse or pieces of greatly varying size, and all large as compared with size of fume particles, renders commercially practical, only a limited final zinc recovery, and restricts to a very material degree, the amount of wash water which may be used in freeing the extracted residue from its pregnant zinc solution.

According to my invention, the zinc ore is roasted under such conditions as to volatilize as much as possible of the zinc, and the zinc so volatilized is allowed to burn while in the vapor phase, producing fume of solid zinc oxid. Such oxid fume is precipitated or collected, preferably by electrical precipitation, and is subjected to action of a solvent liquid, preferably concurrently with its precipitation or collection, and the resulting solution, after removal of all suspended material, is treated for separation of other metals than zinc, and is then electrolyzed for recovery of the zinc. The barren solution resulting from such electrolysis is preferably reused as solvent liquid in cyclic repetition of the process on a further quantity of the zinc oxid fume or dust.

The accompanying drawings illustrate apparatus suitable for carrying out my process, and referring thereto:

Figure 1 is a diagrammatic elevation of such apparatus partly in section.

Fig. 2 is a vertical section of another form of the apparatus, for volatilizing zinc from its ores.

Fig. 3 is a side elevation of a modified apparatus for carrying out my invention.

The apparatus shown in Fig. 1 of the drawing comprises roasting means 1; an electrical precipitator 2 connected by flue 3 to receive the fumes from said roasting means; means for supplying solvent liquid to said electrical precipitators to receive and carry away the material precipitated therein; filtering and agitating means for removing solid materials and other metals than zinc fume from the resulting solution; and electrolytic means 4 for electro-depositing zinc from the purified solution to the leaching stage of the process.

The roasting means 1 may consist of a rotary drum or tube, provided with suitable means for rotation thereof, and provided with means for supplying zinc ore thereto, together with coal or other carbonaceous material, and with means for rotation of said drum, said drum communicating with flue 3 in such manner as to discharge into the latter the zinc fumes produced, and to admit, for example, at the joint 40 between the drum and flue, sufficient air for oxidation of the zinc. Any other means for volatilizing and oxidizing the zinc may be used—for example, a bedded charge furnace as shown at 11 in Fig. 2, provided with a grate 12 for supporting the charge of ore and coal, with a blower 13 for forcing air below said grate and with fume inlet 14 opening into flue 3, with provision for air supply as shown at 15.

The electrical precipitator 2 as shown in the drawing, comprises vertical flues 6, preferably formed as vertical passages in a monolithic concrete structure, said structure having side walls 7, and vertical partitions 8 dividing the space between said walls so as to form said vertical flues, and said flues being round or rectangular in cross-section as may be desired. An inlet header 9, communicating with flue 3, is provided at the upper end of said flues and an outlet header 10 is provided below said flues and communicates with an outlet flue 17. The lower part of lower header 10 may be divided by partitions into a plurality of sump chambers 18, for receiving the liquid draining from the respective flues 6. Discharge electrodes of any suitable construction are mounted in the flues 6, being supported, for example, by insulated frame 19, hung on vertical rods 20 extending upwardly through insulating plates 21 in the top of the upper header and connected to a horizontal frame 22 resting on insulators 23 above said header. Said discharge electrodes may consist of wires 25 suspended from hangers 26 carried by frame 19 and connected at their lower ends to a plate or weight 27. The walls of each flue 7 are preferably inclined upwardly so as to converge downwardly so as to produce better distribution of liquid therein, and the discharge electrode members 25 also preferably converge downwardly so as to be approximately parallel to the opposing walls.

Suitable means, such as nozzles 30, 31, 32 are provided for supplying acid solution or other solvent liquid to the upper parts of the respective flues 6. Pumps 33 and 34 and pipes 35 and 36 are provided for forcing the liquid from each sump chamber 18 at the bottom of a precipitator flue, to the top of another precipitator flue, so as to subject the liquid to a series of exposures to the gas. Cooling tanks 37 may be provided, if required, for cooling the liquid passing through pipes 35 and 36. Said pipes may be arranged to draw liquid only from the upper part of chamber 18, other pipes 39 being provided for drawing off sediment from the lower part of said chambers and conducting the same to filter 40, or elsewhere, as required.

From the last sump chamber 18, a pipe 38 leads to a series of devices, for separating impurities from the liquid, said series including filters 40, 41, 42 and agitators 43, 44 interposed between successive filters for agitating the liquid with suitable reagents, the last filter discharging into a sump 45. Suitable piping is provided for connecting said series of devices, and a by-pass 46 may be provided for each filter. Said filters may be of any suitable type, and if desired, decantation tanks may be used in place thereof, or in conjunction therewith.

A pump 48 forces liquid from sump 45 through pipe 49 to a pregnant solution tank 50 from which the liquid is delivered as required to an electrolyzer 4. From said electrolyzer, barren solution is pumped by pump 52, through pipe 53 to storage tanks 54, whence the solution is delivered as required, through pipe 56 to the nozzle 30 for one of the precipitator flues 6. The walls of flues 6, constituting collecting electrodes are grounded, as indicated at 58, the stream of solution therein giving the conductance required for the electrical precipitation operation. The discharge electrode system is connected by wire 59 to any suitable means for supplying high tension current thereto—for example, such as described in patent to F. G. Cottrell, No. 895,729—August 11, 1908.

My process may be carried out in the above described apparatus as follows:—

To free the zinc from the essentially non-volatile constituents of the ore or concentrates, I effect a metallurgical separation by volatilizing the zinc, allowing it to burn while in the vapor phase so as to produce a solid zinc oxid fume, which is precipitated, dissolved by a suitable solvent liquid, which is purified, and then electrolyzed for recovery of the zinc. The volatilization may be effected in one or more of several different ways—for example, the carbonate or oxid ores may be mixed with coal, sufficient in quantity to provide upon combustion, a strictly reducing atmosphere and temperature sufficient to volatilize the reduced zinc, and a quantity of air or oxygen may then be introduced in the gaseous exits from furnace, sufficient to render the resulting gaseous mixture, oxidizing in character. The furnace construction used may follow the type shown in Fig. 2, of "heap roasting" or bedded charging on stationary grates, with blower discharging beneath grates, etc., or furnaces of "producer gas" type and form, or the type of continuously rotating cylindrical furnaces, of the cement kiln type, as shown in Fig. 1, said furnaces being, for example, 100 or more feet in length.

Or, the calcined mixed sulfids, of possibly Zn, Cu, Pb, Fe, etc., may supply the feed to a reverberatory with reducing atmosphere, or to an electrically auxiliary heated reverberatory, and as in the previous method, the furnace effluent gases being converted to oxidizing nature by admixture of air, either just before the final exit from furnace, or in flue leaving furnace.

Or, the raw sulfids may be smelted directly in converter type of furnace, thus securing essentially the separation of Cu and Fe from the Pb and Zn; the first two remaining essentially in the converter, Cu in its metallic state, and the Fe as ferric oxid and iron silicate, while the Pb and Zn both appear essentially as fumes of oxid and sulfate in the converter gas effluents.

The furnace effluent gases carrying in suspension as fume, essentially all the Zn and Pb constituents of the original furnace feed, together with a certain quantity of dust of Cu, Fe, etc., and of the gangue, and normally, quantities of the acid gases of sulfur, pass directly, and while still at a high temperature, to the electrical precipitator 2, the collecting electrode of which is essentially a flowing sheet or film of the barren zinc solution, returning from the zinc electrolytic depositing cells. This flowing electrode medium may be confined or directed by any of the usual forms of electrode devices, such as pipes, plates or rectangular boxes, etc., used in the art.

In the electrical precipitator, the zinc oxid fumes and other solid material suspended in the furnace effluent gases, are precipitated onto the said stream film or sheet of liquid, with the acid and continually carried away by such stream and the body of liquid containing the precipitated material, is collected in the sump chamber 18. By precipitating the zinc oxid fume from hot furnace gases directly onto the body of solvent liquid certain advantages are obtained as hereafter set forth:

In the present day development of the art and practice of electrical precipitation of metallic fumes by the procedure disclosed in patent of F. G. Cottrell above referred to, the effectiveness of the precipitation has been found to vary greatly with the nature of the metallic fumes encountered, and its physical condition. Zinc oxid fume has shown both in laboratory tests and field operation, that very special conditions must be maintained to secure its proper precipitation and that in gases and collecting electrodes where the existing temperature is over 100° C., the precipitation is usually difficult, due largely to the unfavorable electrical effects of the deposited zinc oxid fumes. These unfavorable effects appear in two ways, and are more marked with increasing deposit of zinc oxid fume, and while they are not peculiar to zinc oxid fume, laboratory work and field experiment have shown zinc oxid fume in dry condition, to be one of the most difficult substances to precipitate on account of its electrical effects. One seriously detrimental effect is decreasing first the high potential which may be carried across the treater terminals without undue arcing over,—i. e., the "arcing voltage." For example, in a special case, I have recorded a 90,000 volt reading across the terminals with carefully cleaned collecting electrode, while a deposit by electrical precipitation of not over $\tfrac{1}{16}''$ zinc oxid fume upon the collecting electrode ($4\tfrac{1}{2}$ to 5 grams per square foot) lowered the potential which could be maintained with only an occasional snap over to some 46,000 volts. A second effect is that the dry deposit of zinc oxid fume (and various other fumes also) acts as an insulator, with the result that as in a special case cited, as a zinc oxid fume deposit approached the value of $4\tfrac{1}{2}$ to 5 grams per square foot of collecting electrode area, the current approached the zero value, and the efficiency of precipitation is naturally decreased.

Within the electrical precipitator, the following continuous conditions and operations prevail: viz.—a prompt and effective precipitation of the dust and fume upon the liquid collecting electrode by the high potential discharge, due in a large measure, to the absolutely uniform electrical field prevailing, since the equivalent of a clean receiving electrode is continuously maintained by the flowing electrolyte acting as a collecting electrode medium. Second, an obsorption of heat from the gases, rendering the solution exceedingly chemically active. The amount of heat absorbed is proportional to the temperature difference between the gases and the collecting electrode medium, their relative volume and velocity, the ratio of collecting electrode surface, to cubic volume of treater unit, etc., and the treater unit dimensions are to be so chosen as to heat requirements, as to provide the best of working conditions. In general practice, this type of apparatus permits of larger working units, and higher impressed potential than in common practice today. Third, due to the acid character of the solution, and its increased chemical activity, due to increased temperature, and the fact that under the influence of a high potential field, there is an apparent decrease in surface tension, the fumes, and as well, the soluble dust precipitated, are immediately and vigorously attacked by the acting collecting electrode flow. Fourth, from sulfid ores, the furnace effluent gases will contain considerable quantities of the acid gases of sulfur, and these in part, may be absorbed, and under the influence of an oxidizing agent in the collecting electrode medium, such as a manganate or permanganates, the unstable sulfites may be converted to those of stable sulfate character.

By returning the solution from the sump chamber of certain of the precipitator flues, to the other precipitator flues, the solution may be exposed repeatedly to the stream of material being precipitated so that the concentration of zinc salt in the solution may be increased to any required extent. In such case, the oxidizing agent, such as a salt of Mn is oxidized at the anode of the electrolytic zinc depositing cells and is in the solution returning from the cells, and is available to oxidize during the period while the solution is functioning as the collecting electrode medium, in the electrical precipitation treater, the sulfite formed, or absorbed on the collecting electrode. By this means, a continual production of $H_2SO_4$, or its equivalent in sulfates, is produced, sufficient to take care of the loss, due to the removing of impurities and neutralization of solution for electrolytic zinc depositing cells, and by this means, the addition of extraneous $H_2SO_4$ in present practice, in cost and volume both large, is, in the main, avoided.

The liquid solution passing the electrical precipitator, the solution now containing in solution besides the zinc, some Fe, Cd, etc., and in suspension, $Pb\ SO_4$ and insoluble dust, is filtered in filter 40, treated in agitator 43 with lime to precipitate iron which is then filtered out in filter 41, the filtrate being then treated with zinc in agitator 44 to precipitate cadmium, etc., and the final filtered and purified Zn solution passed to the electrical zinc depositing cells, and returns thence from these cells as an essentially barren zinc solution, and acid in character. Thus, the solution moves essentially in cyclic flow between the collecting electrode of the electrical precipitation treater unit, and electrical zinc precipitating cells.

In some cases, it may be desirable to subject the fume bearing gas to more than one precipitating action, and in such cases, the apparatus may be arranged as shown in Fig. 3, the flue 60 leading from the volatilizing furnace or source of zinc oxid fume to the inlet of an electrical precipitator 61, the outlet of which is connected by flue 62 to a second electrical precipitator 63, whose outlet is connected to a flue or stack 64. Each of the precipitators 61 and 63 may be of a construction similar to that above described, or of any other suitable construction, and each is provided with liquid supply means for distributing solvent liquid on the collecting electrodes. Said precipitators are provided respectively with sump chambers 65 and 66, having discharge gates 67 and 68 for sediment or sludge, and overflow or decantation pipes 69 and 70 for clear liquid. Substantially all the heavy dust may be removed from the gases in the first precipitator and may be removed through discharge gate 67, so that the fume passing to the second precipitator may consist almost wholly of zinc oxid. Pipe 69 conducts the clear liquid from the first sump 65 to an agitator 71 where it may be treated with lime for precipitation of iron, which is filtered out in filter 72, the filtrate passing to a sump 73. Decantation pipe 70 may also conduct the clear liquid from precipitator sump chamber 66 to sump 73, and liquid may be forced from said sump by pump 74 through pipe 75 to a storage tank 76, whence it flows to the distributing pipe 77 for the second precipitator, so that the solvent liquid moves in a cycle between the precipitator 63 and sump 73, whereby a gradual accumulation and concentration of zinc salt in the liquid may be secured. The heat of the gases causes heating and evaporation of the liquid as it is being circulated in this manner and thus accelerates the concentration, and at the same time, the heating of the liquid makes it more active chemically and increases its solvent action in the zinc contents of the fume precipitated with it by electrical action in the precipitator. A portion of the concentrated liquor is withdrawn from this leaching cycle to an agitator 80 for treatment with a precipitating agent for removal of iron, and the resultant solution is filtered in filter 81 and the zinc is removed therefrom in electrolyzer 82, the barren solution being returned by pump 83 and pipe 84 to a storage tank 85 supplying the solution feed means 86 for the first precipitator. Filter 81 may have wash water supply means 86, the washings being delivered by pipe 87 to a sump 88 which receives the filtrate from filter 81 and supplies it to the electrolyzer.

The process is also applicable to other metals than zinc—for example, lead ore may be roasted to produce fume of lead oxid and such fume may be collected, preferably in an electrical precipitator, in a body of alkali solution, the lead being recovered from such solution by electrolysis and the barren solution returned to the precipitating or collecting means.

While I prefer to employ electrical precipitation and the process offers certain advantages as above set forth in connection with electrical precipitation, it is applicable, in some cases, in connection with collection by mechanical means such as scrubbers, washers, etc.

The typical embodiment of the process is that in which substantially all, or the major portion of the mineral, such as zinc, to be recovered, is volatilized and then precipitated as above described, as such application of my invention presents decided advantages in simplicity of operation and efficiency of recovery. However, in some cases, the invention may be applied with advantage to the recovery of metals from waste fume gases produced incidentally in the operation of roasting, sintering, smelting or converting apparatus.

My invention may also be applied with advantage to the recovery of sulfur and separation of zinc from fumes coming from lead ore sintering machines. In sintering lead, it is usual to limit the amount of pyrites that may be used, so as to avoid excessive amount of sulfur in the fumes, which is a source of danger when bag-houses are used, by reason of the liability of its setting fire to the bags, and is also objectionable when dry electrical precipitators are used, as the dry, highly insulating deposit of sulfur on the electrodes of the precipitator, interferes with the successful operation thereof. By passing the fumes from sintering apparatus through an electrical precipitator, in the manner above described, with flowing liquid electrodes, the sulfur is precipitated satisfactorily in moist condition and is continually carried away, so that it does not interfere with the electrical operation. An important advantage of my process, in this connection, is that ores may be utilized which contain relatively high percentages of pyrites, and which are ordinarily unavailable for that reason. The sludge resulting from precipitation of the dust and fume into said solution may be treated for separation of sulfur and zinc therefrom. In this case, the solution (for example, dilute sulfuric acid) used in washing the receiving electrodes of the precipitator, will be adapted to dissolve zinc, and may be circulated through the precipitator, with filtration after each circulation, until such concentration of zinc is obtained as will enable a fraction thereof to be withdrawn at each cycle. The portion so removed may be treated for final recovery of zinc in electrolytic cells, or the zinc may be precipitated as oxid by milk of lime. If it is desired to avoid admixture of $CaSO_4$ with the precipitated $Zn(OH)_2$, a preliminary treatment with calcium chlorid may be provided, removing the sulfate radical as $CaSO_4$, and the zinc hydrate is then precipitated by milk of lime. The resulting solution of calcium chlorid may then be used on a fresh batch of $ZnSO_4$ solution in cyclic operation. The residue resulting from filtration of the filter sludge is dried, for example, in a rotary steam drier, and then subjected to treatment with carbon bisulfid, in digesters operated in cyclic and counter current manner for solution and removal of elemental sulfur content; the pregnant solution then passing to hot water-heated evaporating pans for recovery of sulfur and distillation of the $CS_2$, the latter being condensed in suitable condensers and returned to the sulfur extracting cycle. The residue from which sulfur has been extracted is returned to feed of the sintering machine.

What I claim is:

1. The process of recovering a metal from its ores, which consists in subjecting the ore to the action of heat and a suitable reagent to produce a fume containing said metal passing the gases containing said fume in contact with a body of liquid capable of dissolving said metal in the fume, precipitating said fume into said body of liquid by the action of an electrical field, subjecting the solution resulting from the action of said liquid on the fume, to treatment for separating the said metal therefrom and utilizing the remaining liquid in cyclic repetition of the process to act on a fresh quantity of fume.

2. The process of separating zinc from an ore thereof, which consists in volatilizing the zinc from the ore in such manner as to produce a zinc bearing fume and precipitating such fume into a body of liquid by the action of an electrical field.

3. The process of separating zinc from an ore thereof, which consists in volatilizing the zinc in metallic form, oxidizing the zinc vapor to produce zinc oxid fume, and passing the resulting fume through an electrical field and in contact with an electrode surface consisting of a moving body of liquid in such manner that the fume is precipitated into said liquid by the action of the electrical field, and is continually carried away from the electrical field by the movement of the liquid.

4. The process of separating zinc from an ore thereof which consists in volatilizing the zinc in metallic form, oxidizing the zinc vapor to produce zinc oxid fume, precipitating such fume by the action of an electrical field, into a body of liquid capable of dissolving zinc therefrom, and subjecting the resulting solution to treatment to first remove suspended material and other impurities therefrom and to then separate the zinc therefrom.

5. The process of recovering zinc from a sulfid ore thereof, which consists in heating the ore in the presence of suitable reagents to produce metallic zinc vapor together with acid bearing gases, oxidizing such vapor to produce zinc oxid fume mixed with acid bearing gases, subjecting the fume to electrical action in contact with a liquid containing water in such manner as to cause precipitation of the fume in said liquid, absorption of acid from said gases, and solution of zinc from the precipitated fume in said liquid by the action of such acid, and separating zinc from the resulting solution.

In testimony whereof I have hereunto set my hand, at Los Angeles, California, this 3rd day of August, 1917.

HARRY V. WELCH.